United States Patent [19]

Dinardo et al.

[11] Patent Number: 5,614,918
[45] Date of Patent: Mar. 25, 1997

[54] GLOBAL POSITIONING SYSTEM ANTENNA FIXED HEIGHT TRIPOD ADAPTER

[75] Inventors: Steven J. Dinardo, Simi Valley; Mark A. Smith, Altadena, both of Calif.

[73] Assignee: The United States of America as represented by the Administrator of the National Aeronautics and Space Administration, Washington, D.C.

[21] Appl. No.: 686,137

[22] Filed: Jul. 24, 1996

Related U.S. Application Data

[63] Continuation of Ser. No. 265,521, Jun. 21, 1994, abandoned.
[51] Int. Cl.⁶ .......................................... H01Q 3/02
[52] U.S. Cl. ...................... 343/882; 248/181.1; 248/516; 248/523; 343/894
[58] Field of Search ........................... 343/757, 878, 343/880, 882, 883, 894; 33/295; 248/168, 181, 298, 516, 523; H01Q 3/02, 3/08

[56] References Cited

U.S. PATENT DOCUMENTS

| 72,358 | 12/1867 | Barlow. | |
|---|---|---|---|
| 918,817 | 4/1909 | Berger. | |
| 2,245,901 | 6/1941 | Chaskin. | |
| 2,575,245 | 6/1948 | Carlson et al.. | |
| 2,804,690 | 9/1957 | Talbot et al.. | |
| 3,195,234 | 7/1965 | Glidden et al.. | |
| 3,239,176 | 3/1966 | Johnson. | |
| 3,430,349 | 3/1969 | Bunton et al. | 248/523 |
| 3,614,047 | 10/1971 | Hitze. | |
| 4,339,880 | 7/1982 | Hall. | |
| 4,494,870 | 1/1985 | Hentschel et al.. | |
| 5,255,005 | 10/1993 | Terret et al. | 343/895 |

FOREIGN PATENT DOCUMENTS

| 390476 | 8/1965 | Switzerland | 248/523 |

*Primary Examiner*—Michael C. Wimer
*Attorney, Agent, or Firm*—John H. Kusmiss

[57] ABSTRACT

An improved Global Positioning em antenna adaptor allows fixed antenna height measurements by removably attaching an adaptor plate to a conventional surveyor's tripod. Antenna height is controlled by an antenna boom which is a fixed length rod. The antenna is attached to one end of the boom. The opposite end of the boom tapers to a point sized to fit into a depression at the center of survey markers. The boom passes through the hollow center of a universal ball joint which is mounted at the center of the adaptor plate so that the point of the rod can be fixed in the marker's central depression. The mountains of the ball joint allow the joint to be moved horizontally in any direction relative to the tripod. When the ball joint is moved horizontally, the angle between the boom and the vertical changes because the boom's position is fixed at its lower end. A spirit level attached to the rod allows an operator to determine when the boom is plumb. The position of the ball joint is adjusted horizontally until the boom is plumb. At that time the antenna is positioned exactly over the center of the monument and the elevation of the antenna is precisely set by the length of the boom.

8 Claims, 5 Drawing Sheets

GLOBAL POSITIONING SYSTEM ANTENNA FIXED HEIGHT TRIPOD ADAPTER

ORIGIN OF THE INVENTION

The invention described herein was made in the performance of work under a NASA contract, and is subject to the provisions of Public Law 96-517 (35 U.S.C. §202) in which the Contractor has elected not to retain title.

This application is a continuation, of application Ser. No. 08/265,521, filed Jun. 21, 1994, abandoned.

TECHNICAL FIELD

The present invention relates generally to equipment for making geophysical measurements and, specifically, to a tripod adaptor for use with Global Positioning System (GPS) antennae such as the type that are used in geophysical studies to monitor movement on earthquake faults.

BACKGROUND ART

Movements of the earth's crust that lead to earthquakes and related seismic phenomena are of great interest to earth scientists who seek to scientifically understand these occurrences and to government entities, as well as to ordinary citizens who seek to minimize the lethal potential of earth movements and even to predict quakes. One only has to contemplate the loss of property and life caused by earthquakes around the world and, particularly, in Southern California, to realize the significance of earthquake studies.

Today it is generally accepted that much seismic activity is due to motion of huge tectonic plates that make up the upper regions of the earth's crust. These plates either slip laterally past one another or actually collide with resulting uplift of mountains and the subduction of one plate under another. This process of plate movement naturally places great strains on the crustal material. When the strain becomes too great, the material gives way, slippage occurs along a fault, and an earthquake results.

Even before the movement of plates was generally understood, scientists realized that earthquakes involved movement and displacement of the earth surface along fault lines. For example, the famous 1906 San Francisco earthquake, which occurred along California's San Andreas fault, resulted in a lateral displacement of several feet which can be readily observed as deviations in roads and fences crossing the fault in Marin County, just north of San Francisco. As a result of this and similar observations, scientists attempted to measure movement along faults to understand and even predict quakes.

Some faults show horizontal movement, while others show vertical movement or a mixture of horizontal and vertical movement. The initial fault measurements involved the use of traditional surveying techniques. Using optical sighting with a theodolite, a network of measurements is made parallel to and across a fault line. In that way even small movements of the fault can be detected. Although the sighting instruments can be left in place permanently, the usual procedure is to have each location marked with a permanent marker (geological survey monument) and to periodically set up portable instruments to make the required measurements. The normal movement along faults is often in the range of a only a few millimeters to a few centimeters per year. However, during an actual earthquake much larger movements, often of several meters, occur. After an earthquake has occurred, it is necessary to rapidly survey the entire fault system to determine what type of movement has occurred and precisely where it has occurred. There is often a premium in being able to rapidly and accurately make the required measurements because understanding the movement caused during the quake may help pinpoint risks from aftershocks.

Although most fault measurements made today are still aimed at determining the distances between monument sites, the technologies employed in the measurements have been changing. In many cases simple sighting through a theodolite has been replaced by newer, more accurate techniques. One great improvement is the use of automated sighting instruments that employ a laser beam to ensure alignment of the sites. A limitation with any form of optical sighting is that the monuments must fall on a line of sight. That means that measurements from mountaintops to valley bottoms may be difficult if intervening ridges or trees or human development blocks the line of sight. Also, meteorological conditions such as rain or fog can temporarily render sighting impossible. Therefore, there has been a series of attempts to use nonoptical measuring methods.

It is possible to measure the distance between two sites by measuring the time it takes a radio wave to travel from one site to another. However, to detect a change in distance of only a few centimeters requires bulky and expensive instruments. It is not economically feasible to make a large number of monument measurements using such a system. In recent years the U.S. Department of Defense has been developing a satellite-based system (the Navigation Satellite Timing and Ranging [NAVISTAR] Global Positioning System [GPS]). The GPS system should make highly accurate measurements, such as those required along earthquake faults, relatively simple and economical.

The basic idea behind the GPS system is to have to a number (at least 18) of special satellites orbiting the earth in stable and well-known orbits. The key to the system is that the satellites each contain an extremely accurate atomic clock. The clock time is coded into a high-frequency radio signal transmitted by each satellite. If a ground-based receiver has a similarly accurate clock, the time for the signal to travel from the satellite to the ground can be determined. Thus, the distance from the satellite to the ground receiver can be found.

A major source of inaccuracy in such a measurement is refraction of the radio wave by the ionosphere. This results in a measurement that does not reflect the shortest distance between the satellite and the ground receiver. This problem is largely eliminated by having the satellites transmit on two different frequencies. Because the different frequencies are refracted differently by the ionosphere, it is possible to make corrections based on the two frequencies that yield the true distance. By measuring the distance from more than one satellite to the ground receiver trigonometry can be used to find the exact location of the receiver in both horizontal and vertical terms. This is ideal for geodetic earthquake measurements, as faults cause both horizontal and vertical displacements. The accuracy of the measurements depend on the type and quality of the receiver, but currently-available portable receivers can yield measurements accurate within a few millimeters or so. This is definitely in the range required for the fault line measurements.

The GPS receivers can be readily adapted to fault line measurements by mounting the receiver's antenna 40 on a typical surveyor's tripod 10 directly above the center of the monument whose position is to be measured. Because the measurement reflects the vertical position of the antenna, it is important to employ a device that allows ready control of the antenna elevation. A prior art method for employing portable GPS receivers attaches the antenna 40 to a top platform 12 of a typical surveyor's tripod 10. As seen in FIGS. 1, the portable GPS antenna 40 comprises sections of different-sized metallic cylinders arranged concentrically. The antenna 40 bears a threaded socket (not shown) by which it can be threaded onto a tribrac adaptor 96 (see FIG. 1).

As seen in FIG. 2, the typical tripod 10 is topped by a substantially flat platform 12 with a large central aperture 14. The tribrac adaptor 96 comprises an anodized aluminum disc which engages the tribrac 95. FIG. 1 shows the tribrac 95, which has a precision optical system by which an operator can look through a side-mounted eyepiece 97 and determine whether the tribrac 95 is located directly over the monument center. The entire tripod setup must be carefully moved from side to side until the tribrac optics indicate that exact placement has been achieved. Then a series of leveling screws 98 are adjusted to ensure that the top surface of the tribrac is perfectly level horizontally. This ensures that the antenna holder 99 which is part of the tribrac adaptor 96 is plumb.

If the limited range of the leveling screws 98 is insufficient to level the device, legs 16 of the tripod 10 must be adjusted. Because the monuments are frequently located in rugged terrain, considerable jockeying of the tripod 10 may be necessary to achieve a level and on mark tribrac 95. Finally, when the tribrac 95 is level and exactly over the center of the monument, the height of the antenna 40 must be determined. Because the tripod legs 16 must be adjusted to achieve correct leveling, the height of the entire structure varies from setup to setup. The exact height of the antenna 40 is determined by using a tape measure to measure the distance between the center of the monument and the lower edge of the largest antenna circle. The exact height of the antenna 40 above the monument is then calculated trigonometrically.

Needless to say, the entire process is very time consuming. Furthermore, the process is susceptible to numerous errors that may compromise the accuracy of the GPS measurement. The measurement of antenna height is particularly fraught with error, because tape measures are notoriously difficult to employ accurately. Furthermore, an entire series of data points must be adjusted for different antenna heights at each measurement point. Mathematically this is trivial, but entering all the height data constitutes yet another potential error.

Unfortunately, the optical system of the tribrac 95 is extremely delicate. A sharp blow, or even vibrations, may decalibrate the optics. If the optics are out of calibration, the actual placement of the antenna 40 may be off by several millimeters—a distance that may be as large as the measured fault movement. This problem can be discovered at the end of a series of field measurements by testing optical calibration of the tribrac, but there is no way to know when the tribrac 95 went bad so the entire series of measurements must be discarded, thereby ruining days of work.

STATEMENT OF THE INVENTION

It is an object of the present invention to a provide a device that makes accurate positioning of a portable GPS antenna or other measuring device rapid and foolproof;

It is another object of the present invention to allow a typical surveyor's tripod to provide the support for the GPS antenna or other device;

It is a further object of the present invention to provide a device that has no optical or other critical components might go out of calibration and cause inaccurate positioning;

It is another object of the present invention to provide a positioning device that can be easily operated on uneven terrain; and It is a further object of the present invention to provide a way to ensure that the GPS antenna or other device is at a uniform elevation without requiring a separate height measurement.

These and other objects are achieved by an improved adaptor employing an antenna boom which comprises a rod of a fixed length. The antenna or other measuring device is threaded onto one end of the boom. The opposite end of the boom tapers to a point which is sized to fit into a depression that exists at the center of all commonly-employed survey markers. The rod passes through the hollow center of a universal ball joint so that the joint is located at about the midpoint of the rod.

The ball joint is mounted at the center of an adaptor plate which can be removably attached to a surveyor's tripod. The top platform of the surveyor's tripod contains a large aperture, and the rod passes through the ball joint and the tripod aperture so that the point of the rod can be fixed in the marker's central depression.

The mountings of the ball joint allow the joint to be moved horizontally in any direction relative to the tripod. When the ball joint is moved horizontally, the angle between the boom and the vertical changes because the boom's position is fixed at its lower end. A spirit level attached to the boom allows an operator to determine when the boom is plumb. The position of the ball joint is adjusted horizontally until the boom is plumb. At that time the antenna is positioned exactly over the center of the monument and the elevation of the antenna is precisely set by the length of the rod.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a device for precisely positioning a measuring device, such as a portable GPS antenna in regards to longitude, latitude, and elevation.

Figure 1:
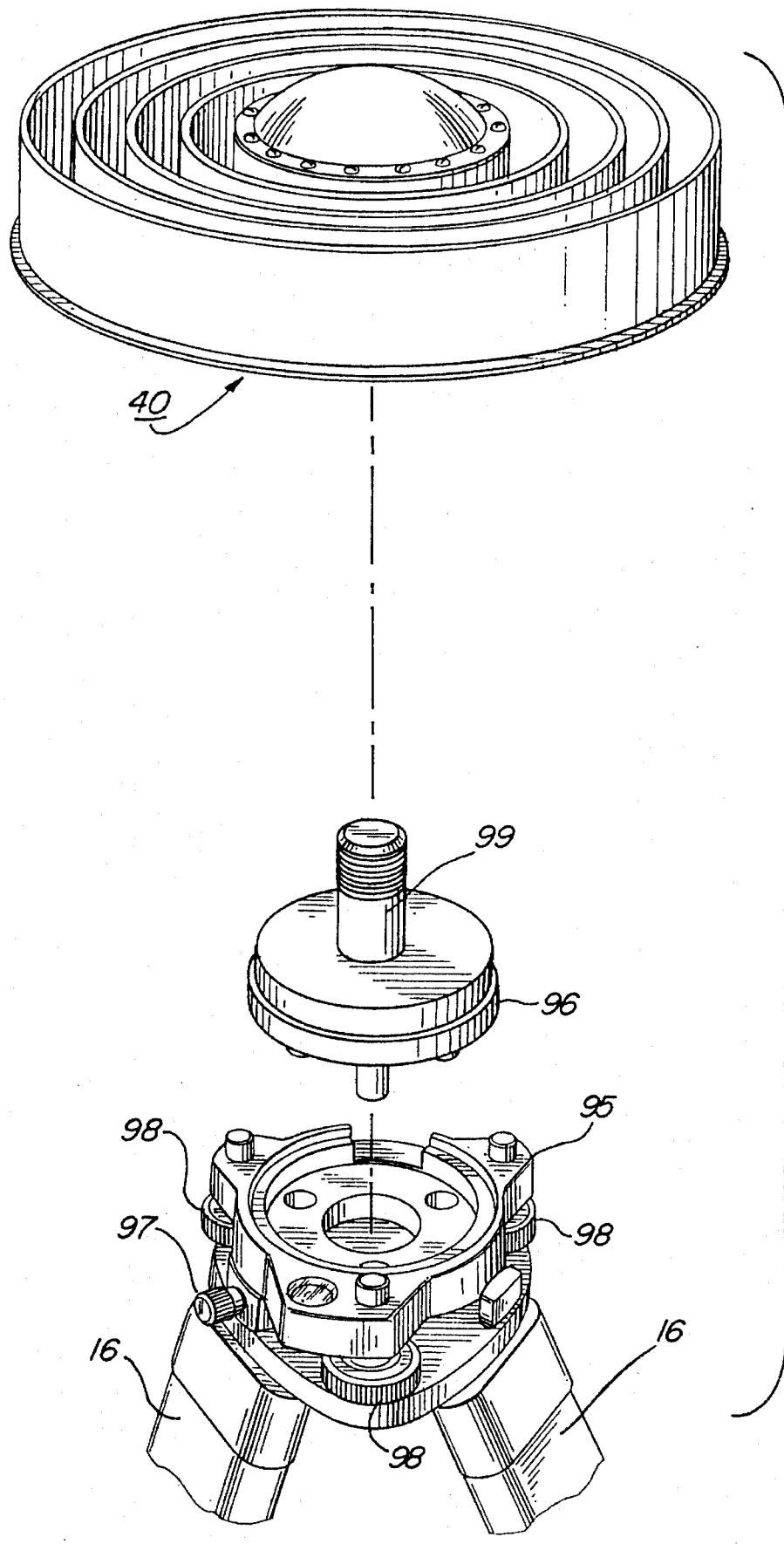
FIG. 1 shows a perspective view of a conventional tripod/tribrac setup including a portable GPS antenna.
Figure 2:
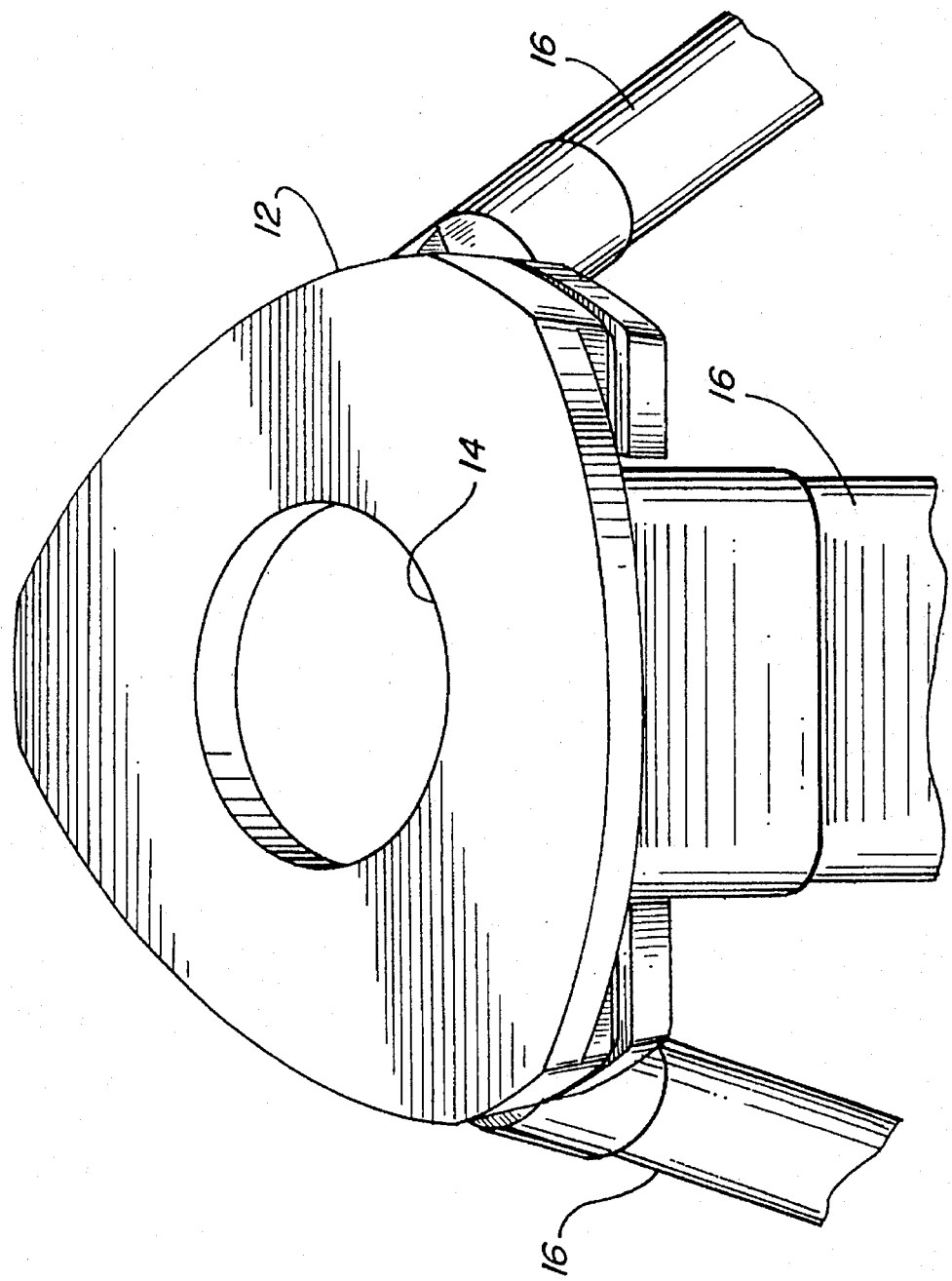
FIG. 2 shows a perspective view of a top platform of the conventional tripod with a large aperture.
Figure 3:
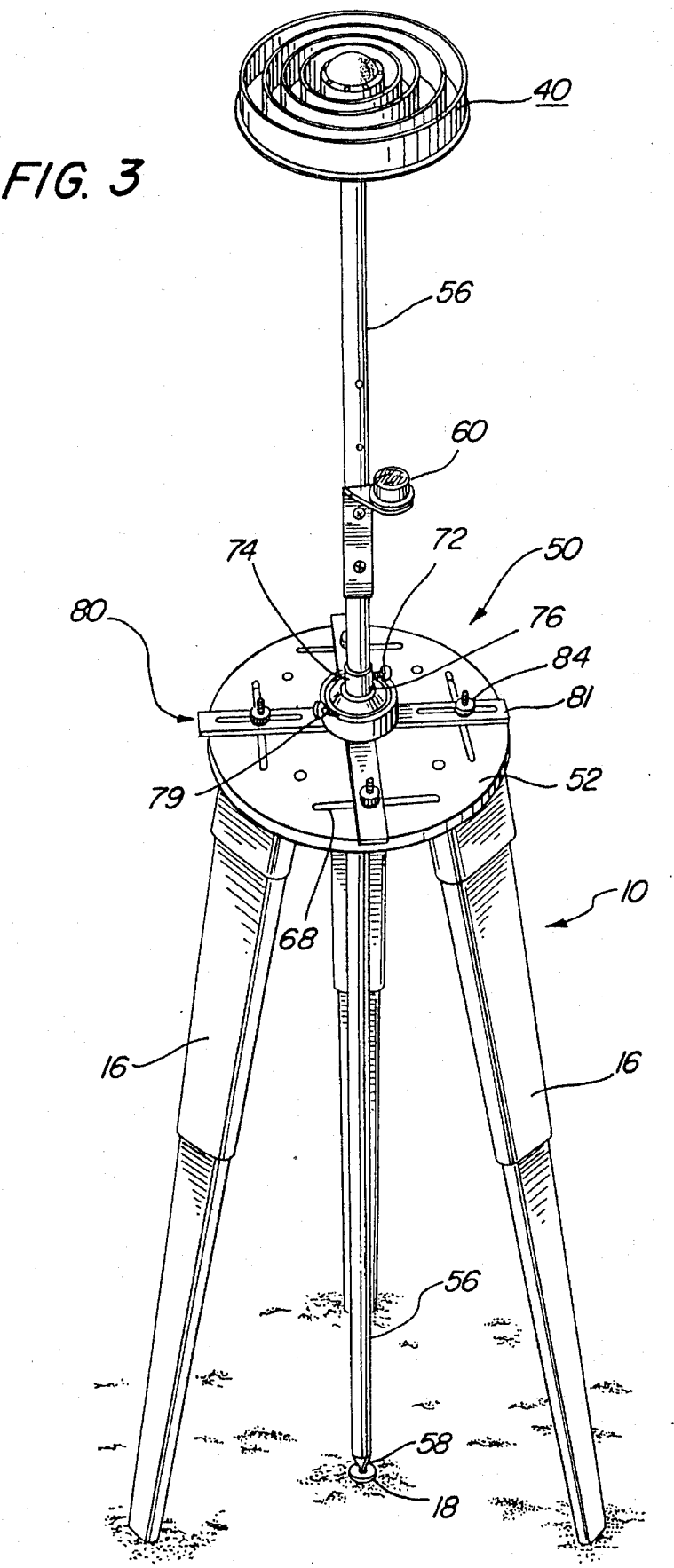
FIG. 3 shows a perspective view of the present invention used with a tripod to position the GPS antenna.

The present invention 50, as seen in FIG. 3, comprises an adaptor plate 52, an antenna boom mount 70 (see FIG. 4) attached to the plate 52, and an antenna boom 56 that passes through the boom mount 70. The adaptor plate 52 is removably attached to a conventional surveyor's tripod 10. As shown in FIG. 2, the tripod 10 bears a platform 12 with a large central aperture 14. FIG. 5 shows that the disc-shaped adaptor plate 52 also has a central circular aperture 64. When the boom 56 is in place, it passes through a sleeve 74 in the center of the boom mount 70 and thence through the adaptor plate aperture 64 and the tripod aperture 14. The antenna boom 56 is removably fixed to the boom mount 70 by a set screw 72 that passes through the sleeve 74 and contacts the boom 56. A lower end of the boom is tapered to a point 58 which is sized to fit a central depression in a survey monument 18.

An upper end of the boom, shown in FIG. 3, is threaded to mate with a socket (not shown) disposed at the center of a lower surface of the antenna 40. A spirit level 60 is provided so that an operator can readily determine when the boom 56 is plumb, an indication that the center of the antenna 40 is located exactly over the center of the survey monument 18. At that time, the antenna 40 has the same longitudinal and latitudinal location as the survey monument depression. Elevation of the antenna 40 is set by the fixed length of the boom 56 and is, thus, the same for each measurement.

FIG. 5 shows the adaptor plate with the circular central aperture surrounded by a circular recessed area 66. Towards the edge of the plate are four adjustment slots 68 evenly spaced around the plate 52. The slots 68 are each perpendicular to a radius of the plate and are mutually perpendicular to each other.

Figure 4:
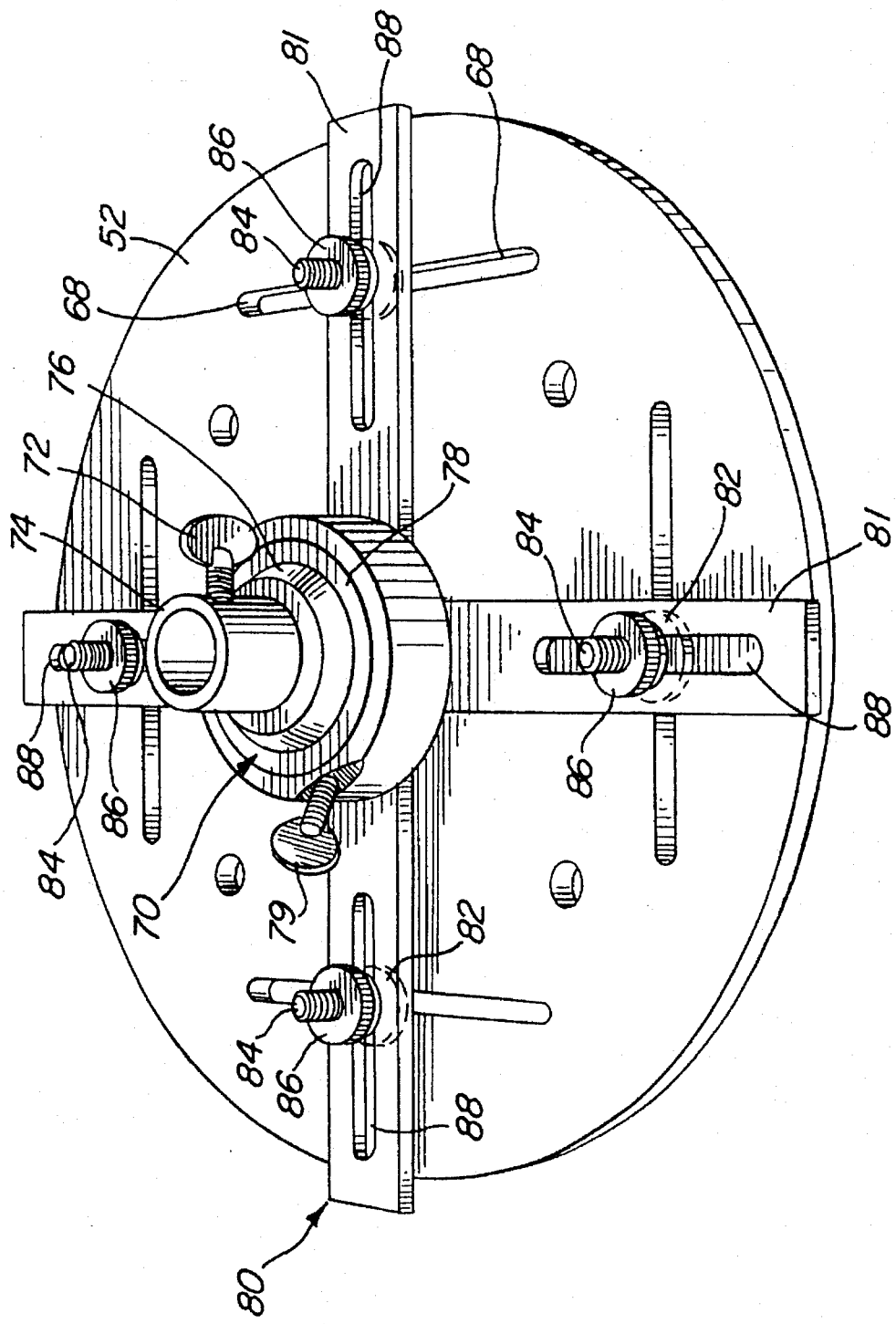
FIG. 4 shows a perspective view from above of the present invention without an antenna boom.
Figure 5:
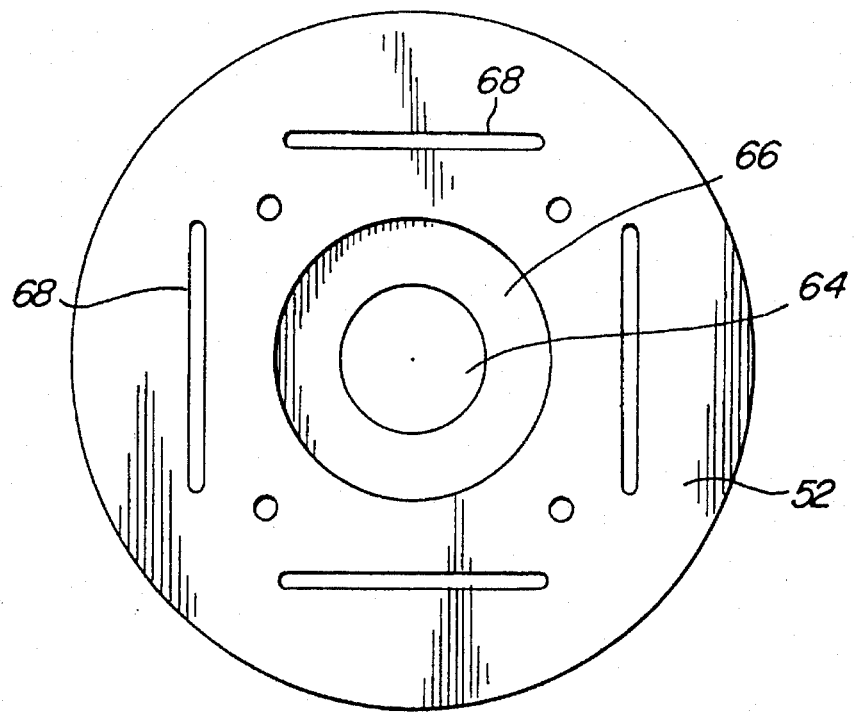
FIG. 5 shows a top surface of an adaptor plate of the present invention.

As shown in FIG. 4 the boom mount 70 comprises the sleeve 74, through which passes the boom 56, and which itself passes through a hollow universal ball joint 76 and an annular ball bearing race 78 which encloses the ball joint 76. The ball joint 76 is free to rotate and pivot within the race 78, allowing the sleeve 74 to take all possible orientations ranging from a vertical position to positions forming acute angles with the vertical and circumscribing a complete circle.

For precision measurements the GPS antenna 40 must always be oriented in the same direction. Therefore, the antenna 40 bears a mark which must be oriented towards true North. To lock the antenna 40 in the proper orientation, a set screw 79 penetrates the race 78 and contacts the ball joint 76. After the antenna 40 is properly set up, the position is locked by tightening the set screw 79.

Four elongate adjustment pieces 81 are permanently attached to the boom mount race 78 at right angles to each other, forming a cross-shaped assembly 80 with the boom mount 70 at its center. When the ball joint 76 is placed over the central aperture 64 of the adaptor plate 52, the adjustment pieces 81 fall along radii of the plate 52 and nonattached ends of the adjustment pieces 81 just reach an outer edge of the plate 52.

The adjustment pieces 81 are slotted longitudinally. That is, each adjustment piece has a slot 88 oriented along a radius of the plate. When the cross-shaped assembly 80 is properly oriented on the adaptor plate 52, the slots 88 in the adjustment pieces 81 form right angles with the adjustment slots 68 of the plate 52. Bolts 84 can then be passed through points where the slots 68, 88 intersect. A head end (not shown) of each bolt 84 remains on a lower surface of the plate because the adjustment slots 68 are too narrow to allow the head to pass. In actual practice a flat washer 82, sized to fit the bolt, is placed between the cross-shaped assembly 80 and the adaptor plate 52 at each point where the slots 68, 88 intersect.

When the bolts 84 are in place passing through the slots 68, 88, each bolt 84 is retained by a knurled nut 86 threaded on an upper end of the bolt 84 and each bolt 84 passes through one washer 82, thereby sandwiching the washers 82 between the adjustment pieces 81 and the adaptor plate 52. If the nuts 84 are loosened, the crossed slots 68, 88 allow the boom mount 70 to be moved freely in any horizontal direction with the weight of the cross-shaped assembly 80 and antenna boom 56 riding on the washers 82. It is also possible to sandwich ball bearings seated in grooves in the plate 52 between the adjustment pieces 80 and the plate 52 to further reduce friction. The recess 66 surrounding the central aperture 64 of the plate 52 accommodates a lower edge of the ball joint 76, which protrudes from the race 78 when the ball joint 76 is pivoted, to maximally displace the sleeve 74 (and the antenna boom 56) from the vertical.

Figure 6:
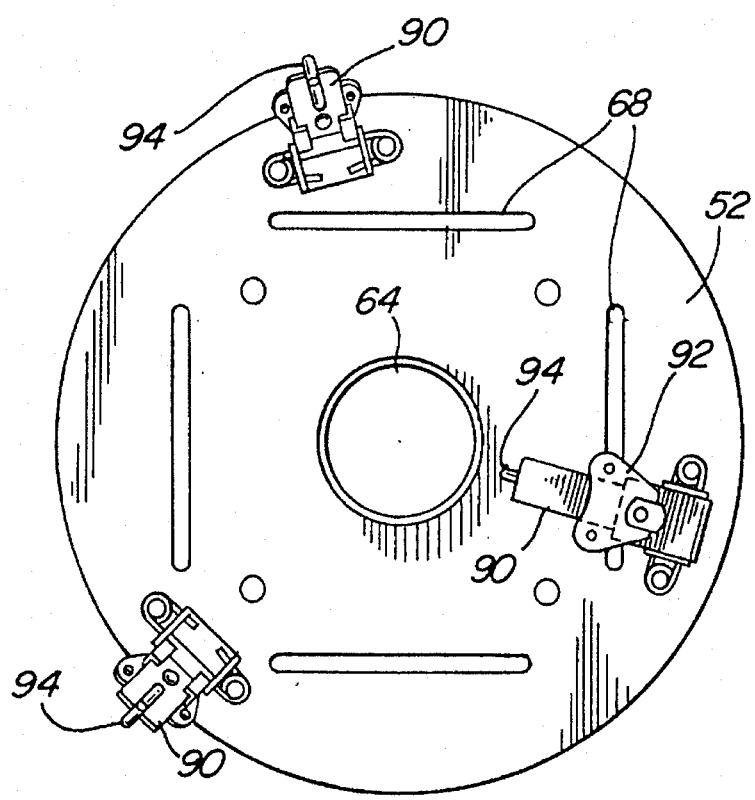
FIG. 6 shows a bottom surface of the adaptor plate of the present invention.

As explained above, the adaptor plate 52, including the cross-shaped assembly 80, is removably attached to the upper surface 12 of a surveyor's tripod 10. FIG. 6 shows a lower surface of the adaptor plate. Three adjustable-length hook-shaped fasteners 90 are hingedly attached to the lower surface of the adaptor plate 52. By loosening a key-shaped retainer 92, a first part of the fastener, which includes a hook 94, is allowed to telescope into a second part, thereby changing the length of the entire fastener 90.

In actual use, the adaptor plate 52 cross-shaped assembly 80 (without the antenna boom 56) is placed on the top surface 12 of the tripod 10. The hook-shape fasteners 90 are then maximally extended and pivoted inward so that the hooks 94 engage a lip on an underside of the tripod platform. The hook-shaped fastener 90 is then shortened so that the hook 94 becomes locked onto the lip, and the key-shaped retainer 92 is tightened. Until the retainer 92 is again loosened, the hook-shaped fastener 90 remains locked to the tripod 10.

With the adaptor plate 52 locked to the tripod 10, the entire assembly is merely placed over a survey monument 18 that is to be measured. The operator simply looks down through the sleeve 74 until the monument center is directly underneath. If the terrain is extremely uneven, the tripod legs 16 are adjusted to make the adaptor plate top surface roughly level. Then the antenna boom 56 is inserted through the boom mount sleeve 74 and the tapered lower tip 58 of the boom 56 is inserted into the monument depression.

The knurled nuts 84 are loosened and the entire cross-shaped assembly 80 is moved horizontally until the spirit level 60 shows that the boom 56 is plumb. At this point, the knurled nuts 84 are tightened to lock the boom mount 70 in position. The set screw 72 on the sleeve 74 is tightened to lock the antenna boom 56 to the boom mount 70 and the antenna 40 is threaded onto the boom 56. The antenna 40 is then turned (the ball joint 76 revolves in its race 78) until the antenna mark points to true North. At this time, the set screw 79 on the race 78 is tightened to lock the antenna 40 in position. An antenna cable (not shown) is then attached to the antenna 40 and the required measurements are made.

This entire sequence takes only a fraction of the time required by the prior art method using a tribrac—and the results are more accurate and consistent.

Although the preferred embodiment just described uses a GPS antenna, this same device and method can be readily adapted for positioning of other measuring devices in relation to a predetermined marker.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

We claim:

1. A device for ensuring rapid and accurate positioning of a portable Global Positioning System antenna so that the antenna has longitude and latitude identical to a stationary survey marker and is disposed at a known altitude above said marker, the device comprising:

an elongate carrying member of a predetermined length for controlling the altitude of the antenna, the member having means at an upper end for removably attaching the Global Positioning System antenna, and means at a lower end for fixing the lower end on the survey marker, thereby defining the longitude and latitude of the antenna when the carrying member is adjusted to be plumb;

horizontally and angularly adjustable support means for supporting the carrying member and for imparting horizontal movement to the carrying member combined with automatic angular accommodation of the support means to the carrying member as said member is moved horizontally by the support means, said support means simultaneously allowing the carrying member to slide longitudinally through the support means while the lower end of the carrying member remains fixed in place on the survey marker;

level determining means attached to the carrying member for indicating when the antenna is disposed at the same latitude and longitude as the lower end of the carrying member by determining when the carrying member is plumb;

locking means for locking the support means in place when the level means determines that the carrying member is plumb; and attachment means for removably attaching the device to a support structure.

2. The device of claim 1, wherein the carrying member is threaded at the upper end to receive the Global Positioning System antenna and tapers to a point at the lower end, the point sized to fit a depression in the survey marker.

3. The device of claim 1, wherein the level determining means comprises a spirit level.

4. The device of claim 1, wherein the adjustable support means comprises a universal ball joint enclosed in a race, the carrying member passing through the ball joint.

5. The device of claim 4, wherein the adjustable support means further comprises slotted adjustment members attached to the race and a slotted adaptor plate connected to the adjustment members by nuts and bolts, the nuts and bolts arranged in slots of the adjustment members and of the adaptor plate to permit horizontal transit of the adjustment members relative to the plate.

6. The device of claim 1, wherein the attachment means comprise hooks pivotally attached to the device so that the device can be removably attached to an upper surface of a surveyor's tripod.

7. A device for ensuring rapid and accurate positioning, in terms of longitude, latitude and height above a marker, of a portable Global Positioning System antenna, the device comprising:

a rod of predetermined length, the rod having a screw thread at an upper end for removably attaching a portable Global Positioning System antenna, and a lower end tapering to a point for fixing the lower end in a depression of a marker permanently fixed to the earth;

a spirit level attached to the rod for determining when the rod is plumb;

a universal ball joint, enclosed in a race, for pivotally supporting the rod, the rod passing through a center of the joint, so that the rod can be made plumb by moving the race in a horizontal direction while the point of the rod is fixed in the depression of the marker;

four elongate rectangular adjustment members, each member slotted from a center of the member to points near two ends of the member, the first end of each member attached to the race and the second end of each member disposed so that the members form a cross-shape with the race in the center;

a substantially flat support disc with a central aperture through which the rod passes when the rod is supported by the ball joint, and with four slots equidistant from a center of the disc and perpendicular to a radius of the disc, each slot perpendicular to adjacent slots so that the race can be placed on top of the central aperture with the elongate members each being perpendicular to one of the slots;

four flat washers, each washer having a central aperture of a diameter about equal to a width of the slots and each washer disposed on an upper surface of the disc with the washer's aperture aligned with one of the slots;

four bolts, each bolt passing through one of the slots, the washer, and the slotted elongate member perpendicular to the slot and a head of the bolt sized to not pass through the slot and be retained on a lower surface of the disc;

four knurled nuts, each nut engaging a free end of one of the bolts so that the race may be moved horizontally when the nut is lose and be fixed when the nut is tightened; and three adjustable-length members hingedly attached to the lower surface of the disc for hooking the disc to an upper surface of a surveyor's tripod.

8. A device for ensuring rapid and accurate positioning of a portable Global Positioning System antenna so that the antenna has longitude and latitude identical to a stationary survey marker and is disposed at a known altitude above said marker, the device comprising:

a Global Positioning System antenna;

an elongate rod of a predetermined length for controlling the altitude of the Global Positioning System antenna, the rod having means at an upper end for removably attaching the Global Positioning System antenna, and a point at a lower end for fixing the lower end in a depression on the survey marker, thereby defining the longitude and latitude of the antenna when the rod is adjusted to be plumb;

horizontally and angularly adjustable support means for supporting the rod and providing automatic angular accommodation of the support means to the rod as the rod is moved horizontally by the support means, said automatic angular accommodation achieved by a universal ball joint, enclosed in a race, for pivotally and slidingly supporting the rod, and for imparting horizontal movement to the rod by means of slotted adjustment members attached to the race and slidingly interacting with a slotted support disc, the rod passing through the center of the ball joint allowing the rod to slide longitudinally through the support means while the lower end of the rod remains fixed in place on the survey marker;

a spirit level attached to the rod indicating when the antenna is disposed at the same latitude and longitude as the lower end of the rod by determining when the rod is plumb;

locking means for locking the support means in place when the spirit level determines that the rod is plumb; and attachment means for removably attaching the support disc to a support structure.

* * * * *